United States Patent
Stegall et al.

(10) Patent No.: US 12,209,874 B2
(45) Date of Patent: *Jan. 28, 2025

(54) COORDINATING TRANSPORT THROUGH A COMMON RENDEZVOUS LOCATION

(71) Applicant: Uber Technologies, Inc., San Francisco, CA (US)

(72) Inventors: Neil Stegall, Pittsburgh, PA (US); Noah Zych, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,124

(22) Filed: Jun. 6, 2023

(65) Prior Publication Data
US 2023/0314146 A1    Oct. 5, 2023

Related U.S. Application Data

(63) Continuation of application No. 17/223,311, filed on Apr. 6, 2021, now Pat. No. 11,740,095, which is a
(Continued)

(51) Int. Cl.
*G01C 21/00* (2006.01)
*G01C 21/34* (2006.01)
(Continued)

(52) U.S. Cl.
CPC ..... *G01C 21/3438* (2013.01); *G01C 21/3415* (2013.01); *G01C 21/3492* (2013.01);
(Continued)

(58) Field of Classification Search
None
See application file for complete search history.

(56) References Cited

U.S. PATENT DOCUMENTS 8,126,903 B2 * 2/2012 Lehmann ............... G06Q 10/06
707/758
9,640,074 B2 * 5/2017 Kustanowitz ...... G06Q 10/0833
(Continued)

FOREIGN PATENT DOCUMENTS

| CN | 106295851 A | 1/2017 |
| JP | 2017100855 A | 6/2017 |
| WO | WO-2016017921 A1 | 2/2016 |

OTHER PUBLICATIONS

Lin, Jane, et al. "A model of multimodal ridesharing and its analysis." 2016 17th IEEE International Conference on Mobile Data Management (MDM). vol. 1. IEEE, 2016. (Year: 2016).*
(Continued)

*Primary Examiner* — Gurkanwaljit Singh
(74) *Attorney, Agent, or Firm* — Schwegman Lundberg & Woessner, P.A.

(57) ABSTRACT

A computing system can maximize throughput for a common rendezvous location by determining estimated times of arrival (ETAs) to the common rendezvous location for matched users and/or transport providers. Based on the ETAs of each of the transport providers, the computing system can generate a dynamic queue comprising the transport providers for the common rendezvous location and manage the dynamic queue by routing the transport providers through the common rendezvous location. The computing system can further dynamically adjust the queue based on changes to the ETAs by transmitting updated navigation-related data to one or more of the matched transport providers.

20 Claims, 6 Drawing Sheets

Related U.S. Application Data continuation of application No. 16/212,983, filed on Dec. 7, 2018, now Pat. No. 11,067,401.

(60) Provisional application No. 62/596,519, filed on Dec. 8, 2017.

(51) Int. Cl.
| | |
|---|---|
| G01C 21/36 | (2006.01) |
| G05D 1/00 | (2006.01) |
| G06Q 10/0631 | (2023.01) |
| G08G 1/00 | (2006.01) |
| G08G 1/0968 | (2006.01) |
| G06Q 50/40 | (2024.01) |

(52) U.S. Cl.
CPC ....... *G01C 21/3617* (2013.01); *G05D 1/0088* (2013.01); *G05D 1/0287* (2013.01); *G06Q 10/06316* (2013.01); *G08G 1/0968* (2013.01); *G08G 1/202* (2013.01); *G06Q 50/40* (2024.01)

(56) References Cited

U.S. PATENT DOCUMENTS

| | | | | |
|---|---|---|---|---|
| 9,671,239 | B2* | 6/2017 | Lord | G06Q 10/06311 |
| 9,904,900 | B2* | 2/2018 | Cao | G06Q 10/083 |
| 10,197,410 | B2* | 2/2019 | Guo | G06F 16/29 |
| 10,607,192 | B2* | 3/2020 | Abbas | G08G 1/202 |
| 11,067,401 | B2 | 7/2021 | Stegall et al. | |
| 2004/0021583 | A1* | 2/2004 | Lau | G01C 21/3617 |
| | | | | 701/418 |
| 2004/0049335 | A1* | 3/2004 | Schmidt | G01C 21/3461 |
| | | | | 340/995.23 |
| 2004/0049424 | A1* | 3/2004 | Murray | G06Q 30/0217 |
| | | | | 705/14.69 |
| 2008/0046173 | A1* | 2/2008 | Lappe | G01C 21/3438 |
| | | | | 701/533 |
| 2008/0195428 | A1* | 8/2008 | O'Sullivan | G06Q 10/025 |
| | | | | 705/6 |
| 2009/0176508 | A1* | 7/2009 | Lubeck | G06Q 50/30 |
| | | | | 455/456.2 |
| 2011/0009098 | A1* | 1/2011 | Kong | G08G 1/202 |
| | | | | 455/457 |
| 2011/0153629 | A1* | 6/2011 | Lehmann | G06Q 10/06 |
| | | | | 707/E17.014 |
| 2011/0301985 | A1* | 12/2011 | Camp | G06Q 50/30 |
| | | | | 705/7.29 |
| 2013/0132887 | A1* | 5/2013 | Amin | G06F 3/0488 |
| | | | | 715/781 |
| 2014/0074743 | A1* | 3/2014 | Rademaker | G06Q 10/0834 |
| | | | | 705/334 |
| 2014/0129302 | A1* | 5/2014 | Amin | G06Q 30/0641 |
| | | | | 705/13 |
| 2014/0222298 | A1* | 8/2014 | Gurin | G06Q 10/08 |
| | | | | 701/49 |
| 2014/0344718 | A1* | 11/2014 | Rapaport | H04L 51/52 |
| | | | | 715/753 |
| 2015/0161564 | A1 | 6/2015 | Sweeny et al. | |
| 2015/0170105 | A1* | 6/2015 | Lim | G06Q 10/109 |
| | | | | 705/7.19 |
| 2015/0324944 | A1* | 11/2015 | Lord | G06Q 50/40 |
| | | | | 705/7.13 |
| 2016/0003637 | A1* | 1/2016 | Andersen | G01C 21/362 |
| | | | | 701/519 |
| 2016/0012465 | A1* | 1/2016 | Sharp | G06Q 20/321 |
| | | | | 705/14.17 |
| 2016/0012645 | A1 | 1/2016 | Kashitani | |
| 2016/0081362 | A1 | 3/2016 | Smith et al. | |
| 2016/0216130 | A1* | 7/2016 | Abramson | G01C 21/3423 |
| 2016/0247113 | A1* | 8/2016 | Rademaker | G06Q 10/083 |
| 2016/0334797 | A1* | 11/2016 | Ross | G05D 1/0027 |
| 2016/0364679 | A1* | 12/2016 | Cao | G06Q 50/30 |
| 2016/0364812 | A1* | 12/2016 | Cao | G06Q 50/30 |
| 2017/0124511 | A1* | 5/2017 | Mueller | H04W 4/029 |
| 2017/0293950 | A1* | 10/2017 | Rathod | G06Q 30/0283 |
| 2017/0310770 | A1* | 10/2017 | Samaan | H04L 67/53 |
| 2017/0314948 | A1* | 11/2017 | Racah | G01C 21/28 |
| 2019/0178656 | A1 | 6/2019 | Stegall et al. | |
| 2021/0223052 | A1 | 7/2021 | Stegall et al. | |

OTHER PUBLICATIONS

Coltin, Brian, and Manuela Veloso. "Ridesharing with passenger transfers." 2014 IEEE/RSJ International Conference on Intelligent Robots and Systems. IEEE, 2014. (Year: 2014).*

U.S. Appl. No. 16/212,983 U.S. Pat. No. 11,067,401, filed Dec. 7, 2018, Coordinating Transport Through a Common Rendezvous Location.

U.S. Appl. No. 17/223,311, filed Apr. 6, 2021, Coordinating Transport Through a Common Rendezvous Location.

"U.S. Appl. No. 16/212,983, 312 Amendment filed Mar. 30, 2021", 10 pgs.

"U.S. Appl. No. 16/212,983, Examiner Interview Summary mailed Jan. 26, 2021", 3 pgs.

"U.S. Appl. No. 16/212,983, Final Office Action mailed Oct. 27, 2020", 30 pgs.

"U.S. Appl. No. 16/212,983, Non Final Office Action mailed Jun. 25, 2020", 15 pgs.

"U.S. Appl. No. 16/212,983, Notice of Allowance mailed Mar. 17, 2021", 10 pgs.

"U.S. Appl. No. 16/212,983, PTO Response to Rule 312 Communication mailed Apr. 16, 2021", 2 pgs.

"U.S. Appl. No. 16/212,983, Response filed Feb. 18, 2021 to Final Office Action mailed Oct. 27, 2020", 16 pgs.

"U.S. Appl. No. 16/212,983, Response filed Oct. 16, 2020 to Non Final Office Action mailed Jun. 25, 2020", 14 pgs.

"U.S. Appl. No. 17/223,311, Non Final Office Action mailed Sep. 22, 2022", 24 pgs.

"U.S. Appl. No. 17/223,311, Notice of Allowance mailed Apr. 13, 2023", 14 pgs.

"U.S. Appl. No. 17/223,311, Response filed Feb. 22, 2023 to Non Final Office Action mailed Sep. 22, 2022", 13 pgs.

"International Application Serial No. PCT/US2018/064443, International Preliminary Report on Patentability mailed Jun. 18, 2020", 8 pgs.

"International Application Serial No. PCT/US2018/064443, International Search Report mailed Mar. 22, 2019", 4 pgs.

"International Application Serial No. PCT/US2018/064443, Written Opinion mailed Mar. 22, 2019", 6 pgs.

Coltin, Brian, et al., "Ridesharing with passenger transfers", IEEE/RSJ International Conference on Intelligent Robots and Systems. IEEE, (2014).

Lin, Jane, et al., "A model of multimodal ridesharing and its analysis", 17th IEEE International Conference on Mobile Data Management (MDM), vol. 1. IEEE, 2016, (2016).

* cited by examiner

COORDINATING TRANSPORT THROUGH A COMMON RENDEZVOUS LOCATION

CROSS REFERENCE TO RELATED APPLICATION

This application is a continuation of U.S. patent application Ser. No. 17/223,311, filed on Apr. 6, 2021; which is a continuation of U.S. patent application Ser. No. 16/212,983, filed on Dec. 7, 2018; which claims the benefit of priority to U.S. Provisional Application No. 62/596,519, filed on Dec. 8, 2017; the aforementioned applications being hereby incorporated by reference in their entireties.

BACKGROUND

Network-based, on-demand transportation services can match requesting users with available transport providers. For example, based on the location of a requesting user, a backend network computing system that coordinates the on-demand transportation services can select a proximate transport provider, from the pool of candidate transport providers, based on the distance or estimated time of arrival of the proximate transport provider to a rendezvous location.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
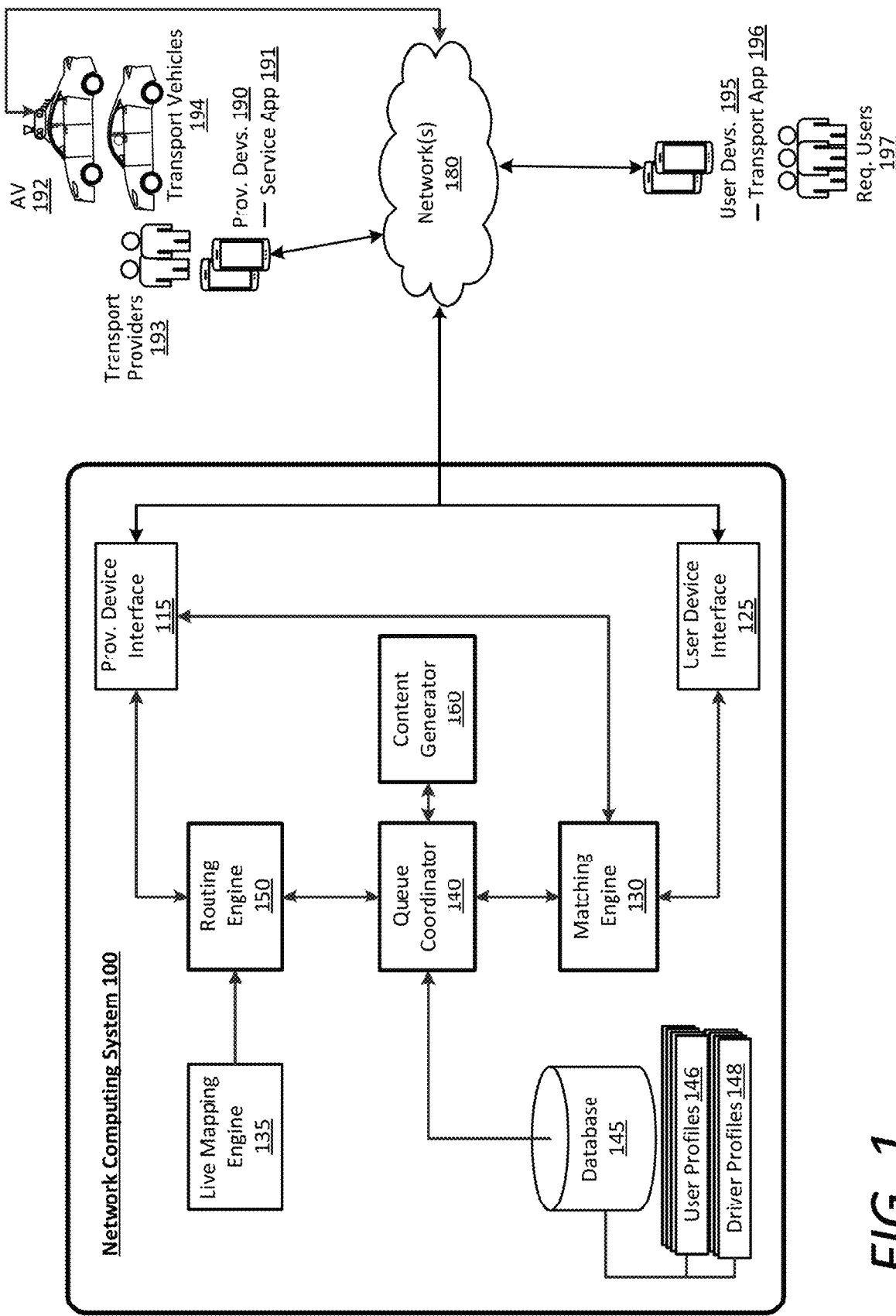
FIG. 1 is a block diagram illustrating an example computing system in communication with users and transport providers, in accordance with examples described herein.

A network computing system can coordinate on-demand transportation between users and transport providers throughout a transport service region. In various embodiments, the network computing system can receive transport requests from a user base via a designation transport application executing on the computing devices of those users. Based on the relative locations of the users and transport providers, as well as estimated arrival times of both the users and transport providers, the network computing system can match a transport request from a user or user with a transport provider and thereafter coordinate a rendezvous and pickup.

The computing system can determine a set of matched users and transport providers having a common rendezvous location. For example, at any given time, a number of transport providers may be en route to a ride demand hot spot (e.g., an airport, sporting venue, concert hall, etc.) to pick up a corresponding number of requesting users at a dedicated or reserved rendezvous location (e.g., a pick-up area leased from a public entity). It is contemplated that traffic congestion cause by inefficiencies in rendezvous throughput for common pick-up and/or drop-off areas can be severe and unnecessarily enduring given modern network technologies. For example, during holidays, many concurrent airplane arrivals can choke pick-up areas, resulting in significant traffic backup and irritation for drivers and passengers.

Example network computing systems described herein can maximize throughput through a common rendezvous location using application-based coordination between transport providers and requesting users of an on-demand transportation service. Rendezvous optimization techniques described herein can further achieve a practical effect of minimizing wait times for transport providers and requesting users at the common rendezvous location. In various examples, the computing system can receive location-based data from computing devices of matched users and transport providers, and determine estimated times of arrival (ETAs) to the common rendezvous location for each of the matched users and the transport providers.

The computing system can track ETAs dynamically for the requesting users based, at least in part on, the user's travel pace (e.g., walking pace), historical data for the user (e.g., a promptness factor), and user profile data (e.g., indicating any disabilities, age, weight, height, etc.). Additionally, the computing system can track the ETAs of the transport providers based on real-time traffic data, driver profile data (e.g., indicating promptness, or fast or slow driving), vehicle type, and the like. Based on the ETAs of each of the transport providers, the computing system can generate a dynamic queue comprising the transport providers for the common rendezvous location. In certain examples, the computing system can further adjust a displayed ETA for a matched transport provider on the requesting user's computing device to provide the user with updated information concerning the timing of the pick-up. For example, if the matched transport provider is shuffled down the dynamic queue for some reason, the ETA of the transport provider as displayed on the user's computing device can be dynamically adjusted accordingly.

In various examples, the network computing system can manage the dynamic queue by sequentially routing the transport providers through the common rendezvous location. The network computing system can further dynamically adjust the dynamic queue based on changes to the ETAs of the matched users and/or the transport providers to the common rendezvous location. In doing so, the computing system can transmit granular routing updates to the transport providers, which can be lane-specific (e.g., delaying the transport provider by routing the provider through slower, more traffic congested lanes), or can comprise a route detour. For example, the network computing system can transmit routing data that causes a map interface displayed on the computing device of the transport provider to generate turn-by-turn directions for the transport provider to follow in order to rendezvous with the matched user. Given a delay by the matched user, the network computing system can transmit updated turn-by-turn route data to correspondingly delay the matched transport provider by a similar time frame.

The transport providers can comprise human-driven vehicles, where communications between the network computing system and the driver of the vehicle can be via an application executing on a computing device (e.g., a smartphone or tablet computer) of the driver. Additionally or alternatively, the transport providers can comprise autonomous vehicles (AVs), in which case communications can be transmitted via a network connection with a control system of the AV. It is contemplated that route control of AVs can be more seamless than human drivers. Accordingly, when a queue of transport providers includes both AVs and human drivers, the network computing system can prioritize delaying AVs while instigating trip swaps between the transport providers and requesting users.

For example, the rendezvous location can include both a user queue and a transport provider queue, and ideally each sequential user can be matched with a next sequential transport provider. When a user is unexpectedly delayed as indicated by the user's determined ETA, without further action, the user's matched transport provider would occupy the rendezvous location or a space of the rendezvous location in a protracted manner. This may be undesirable if the goal is to maximize throughput, especially if other users are awaiting transport in the user queue. Accordingly, in order to preempt this undesirable scenario, the network computing system can prioritize the transport provider as the transport provider approaches the common rendezvous location by swapping rides between the delayed user and a user awaiting transport in the queue. In various examples, the network computing system can transmit update data (e.g., comprising a trip swap notification and identifying information of the newly matched user and transport provider). Accordingly, the network computing system can make real-time adjustments to not only the transport provider queue via routing updates, but also the user queue via trip swaps.

According to certain implementations, the network computing system can further manage ingress to and egress from the common rendezvous location by monitoring upcoming transport providers that are to replace occupying transport providers that are occupying the common rendezvous location. Upon the incoming transport provider approaching the common rendezvous location, the network computing system can transmit an ingress notification to the incoming transport provider to create an egress gap for the outgoing transport provider. Egress gaps can improve the overall flow of traffic while seamlessly transitioning between matched users and transport providers through the common rendezvous location. The network computing system can transmit egress notifications to occupying transport providers to exit the common rendezvous location via the egress gaps created by the incoming transport providers.

In various aspects, the network computing system can leverage the sensor resources of AVs by patching into the live sensor feeds of the AVs and monitoring rendezvous progress at the common rendezvous location. For example, the network computing system can receive image and/or LIDAR data feeds from occupying and incoming AVs to manage ingress and egress at the common rendezvous location (e.g., transmitting ingress and egress notifications). In doing so, the network computing system can further confirm whether a pick-up or drop-off has been completed for either an AV whose sensor data feed the network computing device is monitoring, or a proximate vehicle identified in the sensor data feed of the AV. Furthermore, the network computing system can receive a sensor data feed from pass-through AVs (e.g., AVs not stopping at the common rendezvous location) to monitor the state of the location (e.g., whether the rendezvous location is occupied by an unauthorized vehicle).

In certain aspects, the common rendezvous location can comprise multiple pick-up and/or drop-off spaces. In such aspects, the network computing system can monitor and track the state of each space dynamically (e.g., as either occupied or unoccupied) to coordinate ingress and egress of each space. In doing so, the network computing system can assign a specific rendezvous space to each matched user and transport provider. In certain aspects, the network computing system can include content generator functions that generates can causes displayable content to be displayed on the respective computing devices of the matched user and transport provider. For example, the displayed content can include a mapped view of the common rendezvous location—including the multiple spaces—and can mark the assigned rendezvous space for each matched transport provider and user. The space assignment can be generated, and the mapped view can be triggered to display on the user's and/or transport provider's computing devices at a predetermined time prior to the rendezvous (e.g., one minute prior to pick-up or drop-off).

In certain examples, the network computing system can store a user profile for each requesting user that includes data indicative of boarding time estimates for the user. Such data can identify the attributes of the user (e.g., the user's age, any disabilities, height, weight, travel habits, profession, etc.). In some aspects, the network computing system can further collect data from additional applications on the user's computing device, such as travel data indicating a destination or origin location and/or trip length of the user (e.g., indicating an overseas vacation or business trip). For example, the destination or trip origin can indicate how much luggage the user is expected to carry upon rendezvousing with the transport provider, which the network computing system can factor into the boarding time estimate of the user.

In accordance with various implementations, the network computing system can determine whether to match a requesting user with an AV versus a human-driver vehicle based on a number of factors. For example, the computing system can forecast an availability the rendezvous location by correlating the ETA of the requesting user to the rendezvous location with an expected occupancy or pick-up rate of the rendezvous location when the user is expected to arrive. In certain variations, the computing system can also correlate the ETAs of number of candidate vehicles (e.g., AVs and human-driven vehicles) to which the user may be matched with the expected occupancy or pick-up rate at the rendezvous location when each candidate vehicle is expected to arrive. Along these lines, the computing system can factor in a wait time for the user at the rendezvous location to allow for more favorable pick-up conditions (e.g., an emptier rendezvous location), and can also determine whether an AV or a human-driven vehicle is more suitable or optimal for the pick-up (e.g., has a higher probability of a successful first attempt pick-up and/or a lower probability of a missed pick-up and go-around).

Based, at least in part, on the availability of the dedicated rendezvous location, the computing system can match a requesting user with either an AV or a human-driven vehicle. In certain aspects, if the computing system determines that the rendezvous location is likely to be occupied or otherwise unavailable, the computing system can match the requesting user with an AV to allow for more granular control over the pick-up. For example, the computing system can coordinate the pick-up remotely by transmitting delay instructions (e.g., routing the AV through congested lanes or detouring the AV), providing real-time pick-up location updates based on space availability (e.g., non-dedicated parking spaces or loading zones), and the like.

In variations, the computing system can match the requesting user with a human-driver when the dedicated rendezvous location is expected to be occupied or unavailable. Specifically, the computing system can rely on the driver and the requesting user to arrange the pick-up independently when a pick-up area is less favorable to AVs (e.g., a crowded airport pick-up area where double parking is common). Accordingly, based on the characteristics of the pick-up area and the forecasted availability of a dedicated or reserved rendezvous location, the computing system can match a requesting user with an AV (e.g., when the scenario is conducive to remote rendezvous coordination), or a human-driven vehicle (e.g., when the scenario is less favorable for AVs).

As used herein, "boarding time estimate" comprises a time interval starting from (i) the actual rendezvous between the user and the stopped vehicle of the transport provider, and (ii) moment of departure readiness of the transport provider. Accordingly, the boarding time estimate can comprise the time it takes for the user and/or transport provider to load any luggage or belongings of the user (e.g., in the trunk or cargo space of the vehicle), occupy an available seat, and perform any other actions prior to the driver being ready to egress the rendezvous location (e.g., closing the door and buckling up). The boarding time estimate is distinction from the ETA of the user, which comprises a travel time, or walk time, from the user's current location to the rendezvous location.

It is contemplated that the techniques for coordinating pick-ups and/or drop-offs to maximize throughput at a common rendezvous location described herein are not limited to matched transport providers and requesting users. Rather, the common rendezvous location can comprise a freight drop-off and/or pick-up point (e.g., a trailer hitching location, such as a port or cargo distribution center), a docking station for semi-trailer trucks (e.g., either autonomous or human-driven), or an item delivery location (e.g., food items or packages). Thus, the dynamic queue management techniques described herein may be performed for semi-trailer trucks based on ETAs to the drop-off and/or pick-up point or docking station. The dynamic queue management techniques described herein may also be performed for item delivery at a common rendezvous location, where delivery drivers rendezvous with requesters of food items, packages, or other requested items. It is further contemplated that the transport providers need not be limited to ground vehicles, such as cars, trucks, and semi-trailer trucks. Rather, the rendezvous location can comprise location for passenger pick-up and or drop-off for aerial vehicles, watercraft, submersible vehicles, and the like.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Description

FIG. 1 is a block diagram illustrating an example network computing system 100 in communication with user devices 195 and transport provider devices 190, in accordance with examples described herein. In various examples, the network computing system 100 can include a user device interface 125 that connects with the user devices 195 of requesting users 197 over one or more networks 180. The network computing system 100 can further include a provider interface 115 that connects with transport provider devices 190 over one or more networks 180. As described herein, the transport provider devices 190 and user devices 195 can comprise computing devices, such as a smartphone, tablet computer, or other mobile computing device.

According to some examples, transport vehicles 194 that provide on-demand transport services for the region can include human driven vehicles operated by the transport providers 193, and can also include autonomous vehicles (AVs) 192 that can be readily directed by the network computing system 100 to service transport requests from requesting users 197. For example, a matching engine 130 of the network computing system 100 can match a transport request from a user 197 with an AV 192 (e.g., based on the AV 192 being proximate to the user 197) and transmit a transport directive that causes the AV 192 to reroute and rendezvous with the user 197. Accordingly, the network computing system 100 can coordinate pick-ups and drop-offs of users, packages, comestible goods, and other freight between requesting user 197 and a pool of available transport vehicle 194, which can comprise vehicles operated by human transport providers 193 as well as AVs 192.

In certain implementations, each transport provider 193 within a given transport service region can execute a service application 191 on the transport provider device 190 to initiate an on-duty or available status. Further, the requesting users 197 can execute a transport application 196 on their respective user devices 195 to configure an on-demand transport request (e.g., for user transport, food delivery, freight or package delivery, etc.). In some aspects, the transport provider 193 can operate an aerial vehicle, and the common rendezvous location can comprise a landing and takeoff area. In some aspects, the user 197 can configure a specified destination and/or a specific or suggested pick-up location to rendezvous with a matched transport provider 193 and vehicle 194.

According to examples described herein, the network computing system 100 can include a matching engine 130, which can receive the transport requests from the user devices 195 of the requesting users 197. In various examples, the matching engine 130 can further receive location data from the transport provider devices 190 and/or AVs 192 indicating the dynamic locations of the transport providers 193 operating throughout the transport service region. In certain aspects, the network computing system 100 can further include a mapping engine 135 that generates map data, enabling the matching engine 130 to identify the respective locations of the transport providers 193 based on orientation, direction of travel, and available routes and estimated times of arrival to a rendezvous location with the requesting user 197. Based on an estimated distance or time to the rendezvous location, the matching engine 130 can select a particular transport provider 193 to rendezvous with the requesting user 197 to service the transport request.

In certain implementations, the matching engine 130 can access a user profile 146 of the requesting user 197 stored in a local database 145 to, for example, determine user preferences, such as a preferred vehicle type, transport service type, a preferred pick-up location (e.g., within a certain proximity of the user's current location), and the like. In various aspects, the matching engine 130 can further access driver profiles 148 of a candidate set of transport providers 193 (e.g., operating within a certain distance or time from the user's current location), and filter the candidate set based on the user's inputted or determined preferences (e.g., a luxury vehicle service). Accordingly, the matching engine 130 can select a matching transport provider from the filtered set of candidate transport providers 193 to service a given transport request.

According to examples described herein, the network computing system 100 includes requestor matching and rendezvous coordination functionality that enables precise timing of the match and/or rendezvous based on an enhanced estimated time of arrival (ETA). For example, the network computing system 100 can include a queue coordinator 140 that can track the locations of the users 197 and the transport providers 193, and can determine their respective ETAs dynamically. The network computing system 100 further include a content generator 160 that generates content for display on the user devices 195 and the provider devices 190. The network computing system 100 can further include a live mapping engine 135 and a routing engine 150.

According to examples described herein, when the matching engine 130 has matched requesting users 197 with transport providers 193, the queue coordinator 140 can monitor the locations of the pick-up locations to identify a common rendezvous location. As provided herein, a common rendezvous location corresponds to a rendezvous area where multiple pick-ups, drop-offs, and/or stopped vehicles cause traffic congestion. Such common rendezvous locations can correspond to mass egress events, such as people exiting concert or entertainment venues, sporting venues, movie theaters, conference venues, airports, train stations, and the like. As provided herein, the queue coordinator 140, content generator 160, and routing engine 150 can collectively act to maximize throughput for the common rendezvous location.

In various examples, the routing engine 150 can monitor live map and traffic data of the common rendezvous location generated by a live mapping engine 135 of the network computing system 100. The routing engine 150 can further receive location-based data from the transport provider devices 190 and the user devices 195 of each of the matched users 197 and transport providers 193. The location-based data can be streamed or periodically transmitted (e.g., via positioning system, such as GPS, of the provider devices 190 and user devices 195). Based on the location data, the routing engine 150 can determine ETAs to the common rendezvous location for each of the matched users 197. The routing engine 150 can further determine ETAs to the common rendezvous location for each of the matched transport providers 193.

Based on the ETAs of each of the matched transport providers 193, the queue coordinator 140 can generate a dynamic queue comprising the matched transport providers 193 for the common rendezvous location. As provided herein, the dynamic queue can comprise an ordering of upcoming transport providers 193 to the common rendezvous location, which the queue coordinator 140 can manage by sequentially routing the transport providers 193 through the common rendezvous location. In one scenario, the queue coordinator 140 provides rendezvous instructions to the transport providers 193, via instructive content generated by the content generator 160. The instructive content can be displayed on the transport provider device 190 via the service application 191, and can provide detailed information to the transport provider 193 for picking up or dropping off a user 197. This information can include which vehicle to follow (e.g., indicating the vehicle's make, model, color, and/or license plate number), a precise point to pull over to the curb (e.g., based on the monitored location of the matched user 197), whether to create a gap for an egressing vehicle, which lane to select, and the like.

In certain implementations, the queue coordinator 140 can dynamically adjust the dynamic queue based on changes to the ETAs of at least one of the matched users 197 or the transport providers 193 to the common rendezvous location. According to various aspects, the queue coordinator 140 can dynamically adjust the dynamic queue by transmitting updated turn-by-turn route data to a selected transport provider 193 in the dynamic queue to delay the selected transport provider 193. For example, a matched user 197 may be delayed in transit to the common rendezvous location (e.g., for a restroom break or a stop in a goods store). The routing engine 150 can identify the delay and project an increased ETA for the user 197. Based on the increased ETA, the queue coordinator 140 can seek to increase the ETA of the matched transport provider 193 by a corresponding amount by determining updated, turn-by-turn route data to delay the transport provider 193 and prevent the transport provider 193 from contributing to congestion in the common rendezvous location. For example, the turn-by-turn route data can comprise lane-specific route data that delays the selected transport provider 193 by routing the transport provider 193 through one or more traffic congested lanes, or detours the transport provider 193 along an alternate route.

In various examples, the matched transport providers 193 can include AVs 192. It is contemplated that AVs 192 can be controlled more directed by the queue coordinator 140 and routing engine 150 to perform traffic management and throughput efficiency tasks. In some aspects, the routing engine 150 can interact with the queue coordinator 140 to prioritize the delay of matched AVs 192 over matched human-driven vehicles 194. In further examples, the routing engine 150 can manage ingress to and egress from the common rendezvous location by monitoring an incoming transport provider 193 that is to replace a current transport provider 193 occupying the common rendezvous location. Upon the incoming transport provider 193 approaching the common rendezvous location, the queue coordinator 140 can transmit an ingress notification to the computing device 190 of the incoming transport provider 193 to create an egress gap for the current transport provider 193. The queue coordinator 140 may then transmit an egress notification to the current transport provider 193 to exit the common rendezvous location via the egress gap created by the incoming transport provider 193. In certain examples, each of the upcoming and current transport providers 193 can comprise autonomous vehicles 192. In such examples, the routing engine 150 can monitor the upcoming transport provider 193 and/or exiting transport provider 193 by receiving a live sensor data feed from a sensor system of the AV 192.

In various implementations, the common rendezvous location can comprise a dedicated loading zone for at least one of user pick-up and user drop-off. Such dedicated loading zones can be located at mass egress venues, such as sporting and entertainment venues, airports, office buildings, train stations, concert halls, and the like. The queue coordinator 140 can routing engine 150 can maximize throughput for these loading zones through the notification, routing, and queue management techniques described herein. In further implementations, the queue coordinator 140 can identify a large discrepancy between the ETA of the matched user 197 and the ETA of a matched transport provider 193. For example, if the discrepancy exceeds a predetermined threshold (e.g., one minute), the queue coordinator 140 can trigger the matching engine 130 to swap the matched transport provider 193 with a new requesting user 197. In such a scenario, the matching engine 130 can transmit updated match information of a newly matched user 197 and transport provider 193 involved in the swap.

In certain scenarios, the common rendezvous location can comprise multiple vehicle spaces. In these scenarios, and the routing engine 150 can sequentially route the transport providers 193 through the multiple vehicle spaces by matching each matched user 197 and transport provider 193 with a specified one of the vehicle spaces. The content generator 160 can transmit displayable content to the computing devices 190, 195 of each of the matched user 197 and transport provider 193 indicating the specified vehicle space. Furthermore, as the queue coordinator 140 monitors the respective ETAs of the user 197 and matched transport provider 193, as well as the ingress and egress of vehicles in the multiple vehicle spaces, the queue coordinator 140 can dynamically change the assigned vehicle space for the matched user 197 and transport provider 193.

In various implementations, the network computing system 100 can include a database 145 storing user profiles 146 for each requesting user 197 and driver profiles 148 for each transport provider 193. In some aspects, the user profile 146 can include historical user data indicating a timeliness or promptness of the user 197. The historical data can indicate instances in which the user was early, late, or on-time to the rendezvous location for each requested transport service. The queue coordinator 140 can perform a lookup in the user profile 146 of a requesting user 197 to determine whether that user 197 has a propensity towards being early or late, and can adjust the dynamic ETA to the common rendezvous location of the requesting user 197 accordingly.

The respective ETAs of the matched transport provider 193 and requesting user 197 can be utilized to determine a boarding time estimate for the user 197, which can include additional factors such as loading time, boarding assistance, and the like. In certain aspects, the queue coordinator 140 can infer an boarding time estimate based on the common rendezvous location. For example, the queue coordinator 140 can infer increased boarding time for an international airport terminal, due to the need to load luggage. As another example, the user profile 146 may indicate that the requesting user 197 has a physical disability, and will require additional time and/or assistance to be secured in the vehicle 194. The queue coordinator 140 may then prevent stacking of the vehicles 194 at the common rendezvous location by accounting for the boarding time estimate of the user 197.

In additional implementations, the destination of the user 197 can indicate whether the user 197 will require additional boarding time. For example, the destination may correspond to an international airport terminal, a retirement community, a hospital, etc. The queue coordinator 140 can adjust the boarding time estimate for the user 197 based on such destinations.

As provided herein, the queue coordinator 140 can determine the ETA dynamically for the requesting user 197 based, at least in part on, the user's travel pace (e.g., walking pace), historical data for the user (e.g., a promptness factor), and user profile data (e.g., indicating any disabilities, age, weight, height, etc.). Additionally, the queue coordinator 140 can determine the ETA of the matched transport provider 193 based on real-time traffic data, profile data from the transport provider's profile 148 (e.g., indicating promptness, or fast or slow driving), vehicle type, and the like. Based on the ETAs of the transport providers 193 en route to the common rendezvous location, the queue coordinator 140 can manage a dynamic queue comprising the transport providers 193 for the common rendezvous location. In certain examples, the content generator 160 can adjust a displayed ETA for a matched transport provider 193 on the requesting user's computing device 195 to provide the user 197 with updated information concerning the timing of the pick-up. For example, if the matched transport provider 193 is shuffled down the dynamic queue, the ETA of the transport provider 197 as displayed on the user's computing device 195 can be dynamically adjusted accordingly.

In certain aspects, the availability of the common rendezvous location can affect whether the matching engine 130 matches a requesting user 197 with a human-driven vehicle 194 or an autonomous vehicle 192. In certain aspects, if the queue coordinator 140 determines that the common rendezvous location is likely to be occupied or otherwise unavailable when the matched transport provider 193 arrives, the matching engine 130 can match the requesting user 197 with an AV 192 to allow for more granular control over the pick-up. For example, once matched, the routing engine 150 can coordinate the pick-up remotely by transmitting delay instructions (e.g., routing the AV 192 through congested lanes or detouring the AV 192), providing real-time pick-up location updates based on space availability (e.g., non-dedicated parking spaces or loading zones), and the like.

User Device

Figure 2:
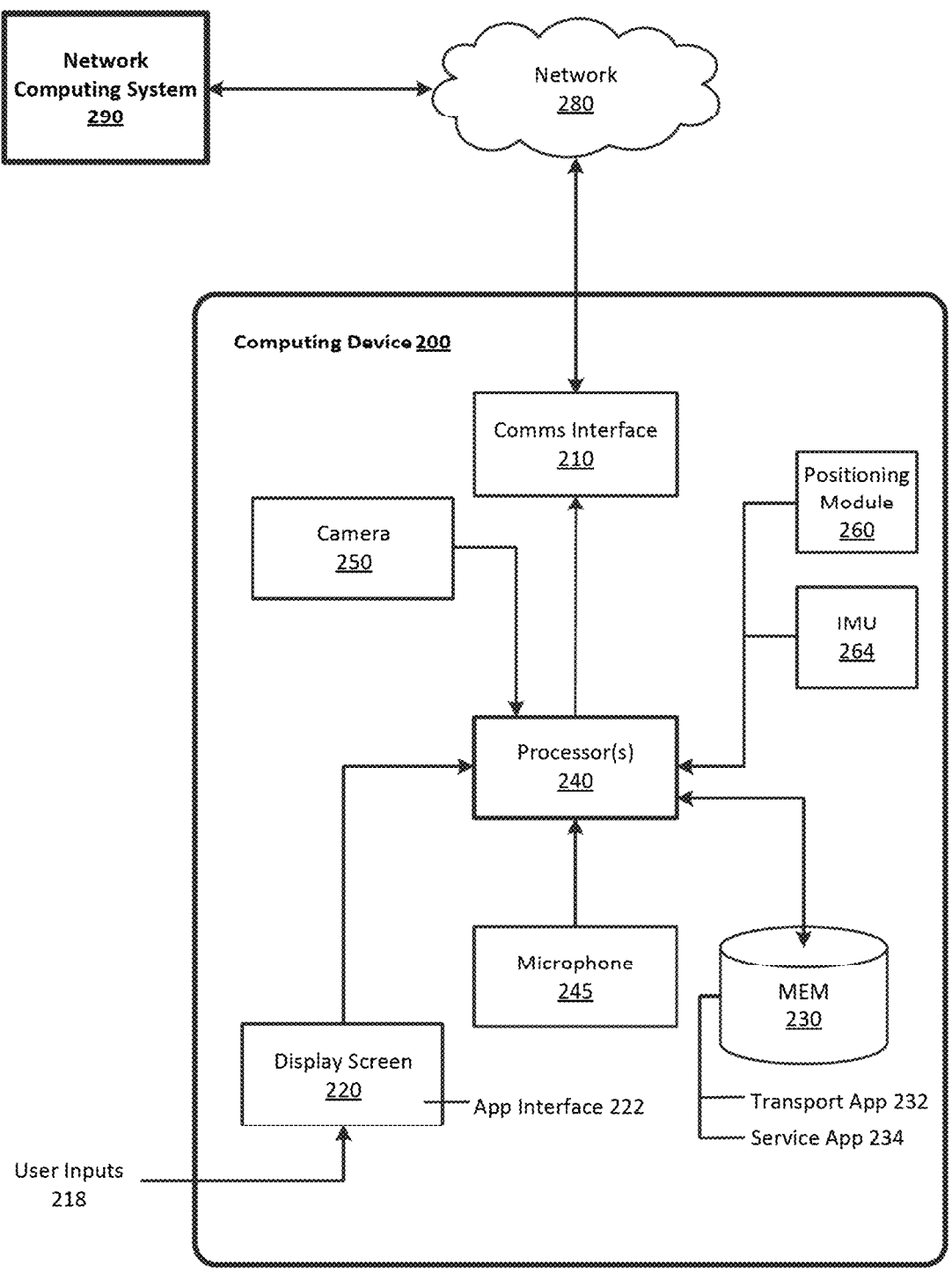
FIG. 2 is a block diagram illustrating an example user device executing and operating a designated transport application for communicating with a network transport service, according to examples described herein.

FIG. 2 is a block diagram illustrating an example computing device 200 executing and operating a designated transport application 232 for communicating with a network computing system 290 implementing a network transport service, according to examples described herein. The network computing system 290 can correspond to the network computing system 100 shown and described with respect to FIG. 1. In many implementations, the computing device 200 can comprise a mobile computing device, such as a smartphone, tablet computer, laptop computer, VR or AR headset device, and the like, and can be controlled by either a human driver or a requesting user. The computing device 200 can include typical telephony features such as a microphone 245, a camera 250, and a communication interface 210 to communicate with external entities using any number of wireless communication protocols. The computing device 200 can further include a positioning module 260 (e.g., GPS receiver) and an inertial measurement unit 264 that includes one or more accelerometers, gyroscopes, or magnetometers. In certain aspects, the user device 200 can store a designated application (e.g., a transport app 232 for requesting users, and/or a service app 234 for transport providers) in a local memory 230. In the context of FIG. 1, the transport app 232 can comprise the transport app 196 executable on the user device 195, and the service app 234 can correspond to the transport service app 191 executable on the transport provider device 190. In variations, the memory 230 can store additional applications executable by one or more processors 240 of the user device 200, enabling access and interaction with one or more host servers over one or more networks 280.

In response to a user input 218, the transport app 232 or service app 234 can be executed by a processor 240, which can cause an app interface 222 to be generated on a display screen 220 of the computing device 200. The app interface 222 can enable the user to, for example, configure an on-demand transport request, view turn-by-turn map directions (e.g., based on route data transmitted by the network computing system 290), present update data indicating a trip swap, and display status updates, such as ETA changes. In various implementations, the app interface 222 can further enable the user to enter or select a destination location (e.g., by entering an address, performing a search, or selecting on an interactive map). The user can generate the transport request via user inputs 218 provided on the app interface. For example, the user can input a destination and select a transport service option to configure the transport request, and select a request feature that causes the communication interface 210 to transmit the transport request to the network computing system 290 over the one or more networks 280.

As provided herein, the transport application 232 can enable a communication link with a network computing system 290 over the network(s) 280, such as the computing system 100 as shown and described with respect to FIG. 1. The processor 240 can generate user interface features (e.g., mapping content, request status information, etc.) using content data received from the network computing system 290 over the network(s) 280.

The processor 240 can transmit the transport requests via a communications interface 210 to the backend network computing system 290 over the network 280. In response, the user device 200 can receive a confirmation from the network system 290 indicating the selected transport provider that will service the request. In various examples, the user device 200 can further include a positioning module 260, which can provide location data indicating the current location of the requesting user to the network system 290 to, for example, determine the rendezvous location and/or track the user to determine an ETA for the user to the common rendezvous location.

In various examples, the computing device 200 may be utilized by a transport provider via the executing service app 234. A transport invitation may be received from the network computing system 290 over the one or more networks 280. Using the app interface 222, the transport provider may accept or decline the transport request. If accepted, the app interface 222 can display a rendezvous location (e.g., on map content), and provider the transport provider with turn-by-turn directions to the rendezvous location. As described herein, the network computing system 290 can update the turn-by-turn directions to, for example, delay the transport provider. In certain implementations, the network computing system 290 can transmit update data to cause the app interface 222 to present instructions for entering and exiting the common rendezvous location, such as instructing the transport provider to create a gap for an egressing vehicle, or identifying an assigned space for the transport provider to pull over.

Common Rendezvous Location

Figure 3:
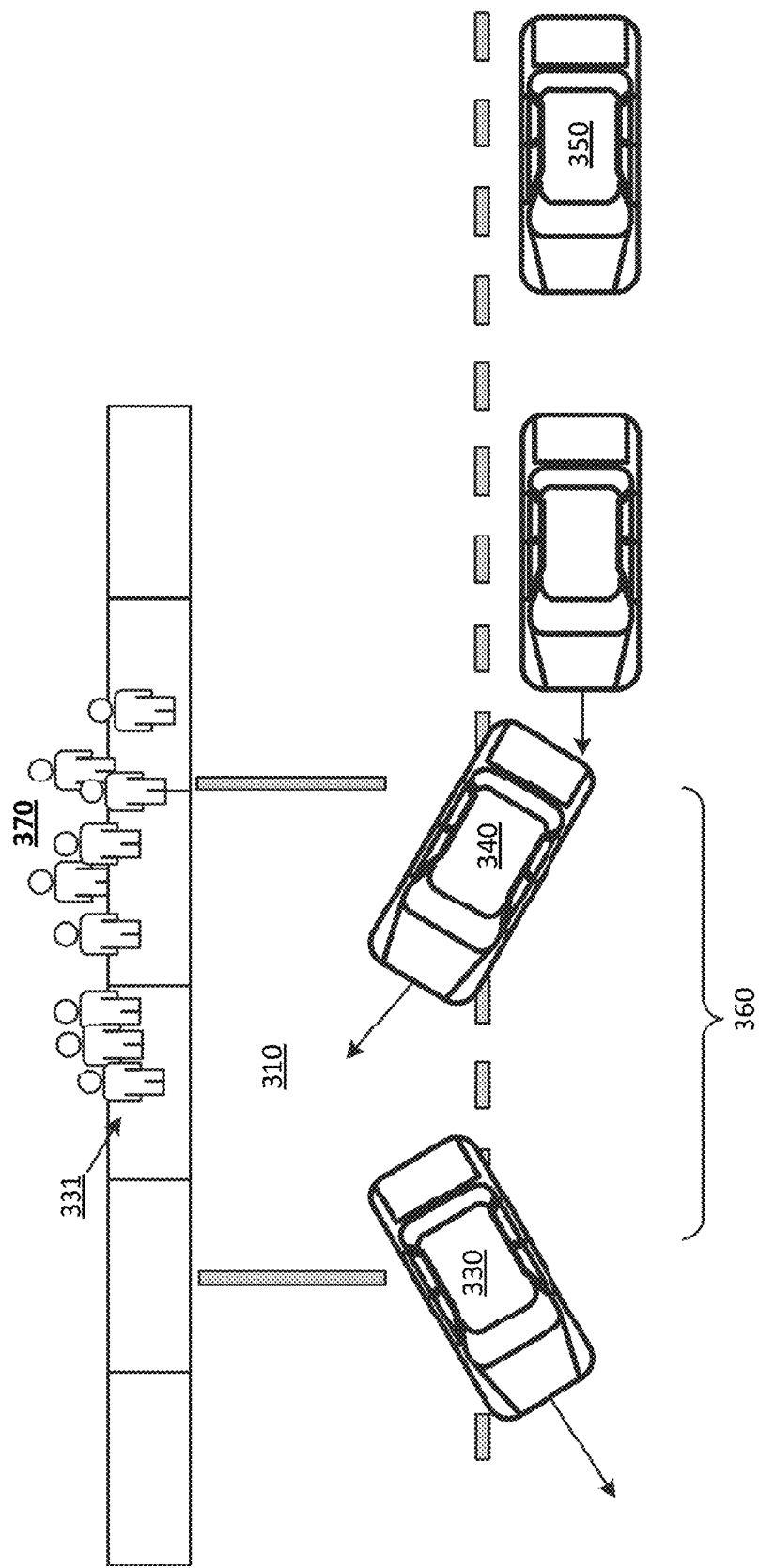
FIG. 3 depicts a common rendezvous location coordinated by example network computing systems described herein.

FIG. 3 depicts a common rendezvous location coordinated by example network computing systems described herein. At any given time, a queue of requesting users 370 may be awaiting transport from arriving transport providers at a common rendezvous location 310. The common rendezvous location 310 can be managed remotely by a network computing system 100, described with respect to FIG. 1. The network computing system 100 can determine ETAs for the users and transport providers, and transmit instructions to the requesting users 370 and transport providers to optimize traffic flow through the common rendezvous location 360 and maximize throughput. In one example, an egressing transport vehicle 330 can be provided instruction (e.g., on map content) to pull out in front of an ingress vehicle 340. For example, the ingress vehicle's 340 make, model, and/or color can be presented to the egressing transport provider 330 with an instruction to pull out in front of the ingress vehicle 340.

Additionally or alternatively, the network computing system 100 can provide an instruction to the ingress vehicle 340 to create a gap 360 for the egressing vehicle 330 to prevent other vehicles from blocking the egressing vehicle 330. In various examples, the next user 331 in the queue of requesting user 370 can be provided instructions indicating that the user's 331 matched vehicle 340 is arriving imminently. Based on the boarding time estimate of the next user 331, the network computing system 100 can provide instructions for an upcoming transport provider 350 to, for example, slow down, create a gap, or follow a vehicle closely. Furthermore, based on the ETA of the upcoming vehicle 350, the network computing system 100 can provide instructions to the current transport provider 340 to delay egressing the common rendezvous location 310 (e.g., an instruction to wait fifteen seconds) in order to make the location 310 available for the upcoming transport provider 350. In such examples, identifying information, such as the make, model, and color of the upcoming transport provider 350 can be provided to the current transport provider 340 to enable the current transport provider 340 to properly time the egress accordingly. When the upcoming transport provider 350 nears the common rendezvous location 310, the network computing system 100 can further transmit an instruction to the upcoming transport provider 350 to create a gap to enable the current transport provider 340 to egress safely and efficiently.

Methodology

Figure 4:
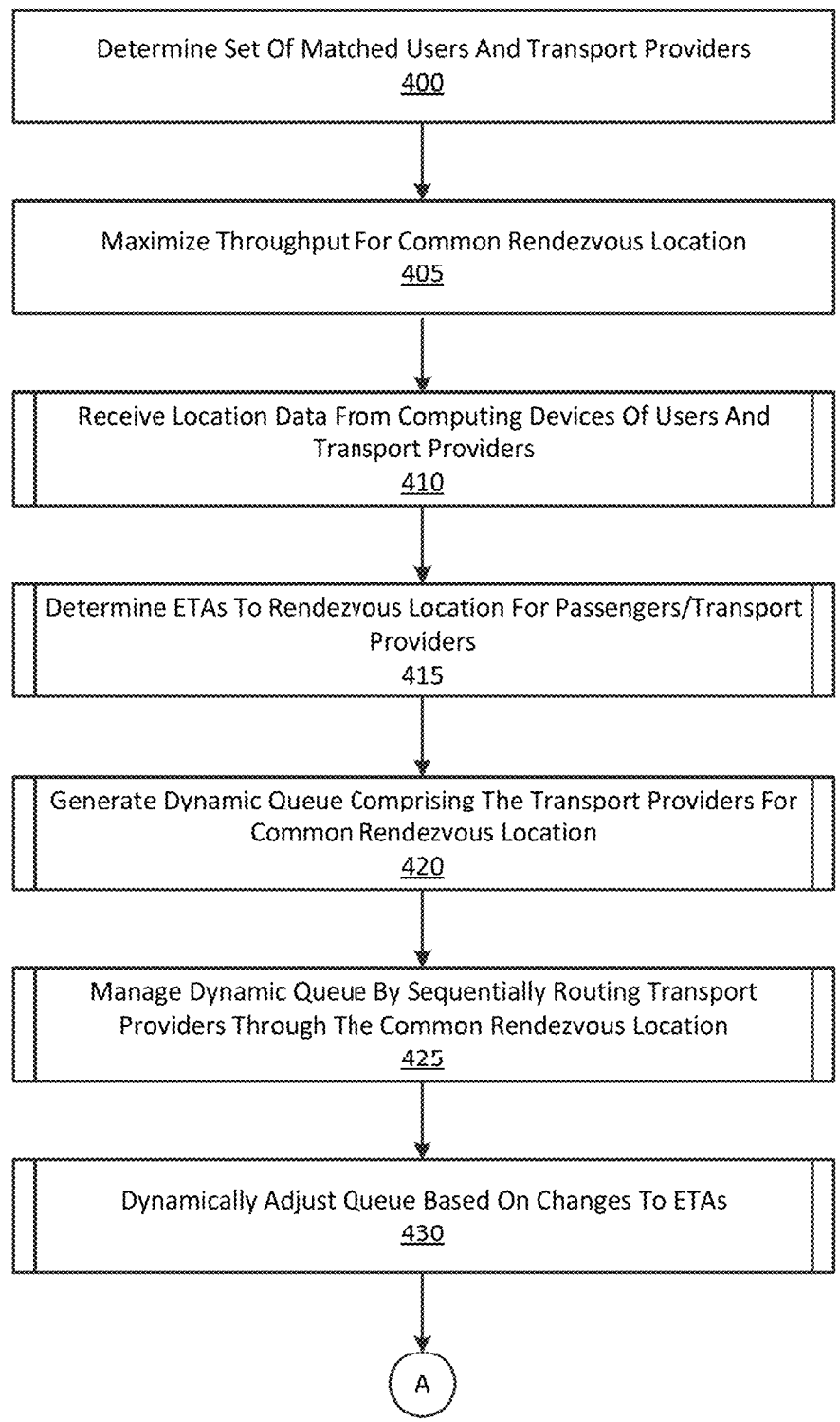
FIG. 4 is a flow chart describing an example method of coordinating transport through a common rendezvous location, according to examples described herein.
Figure 5:
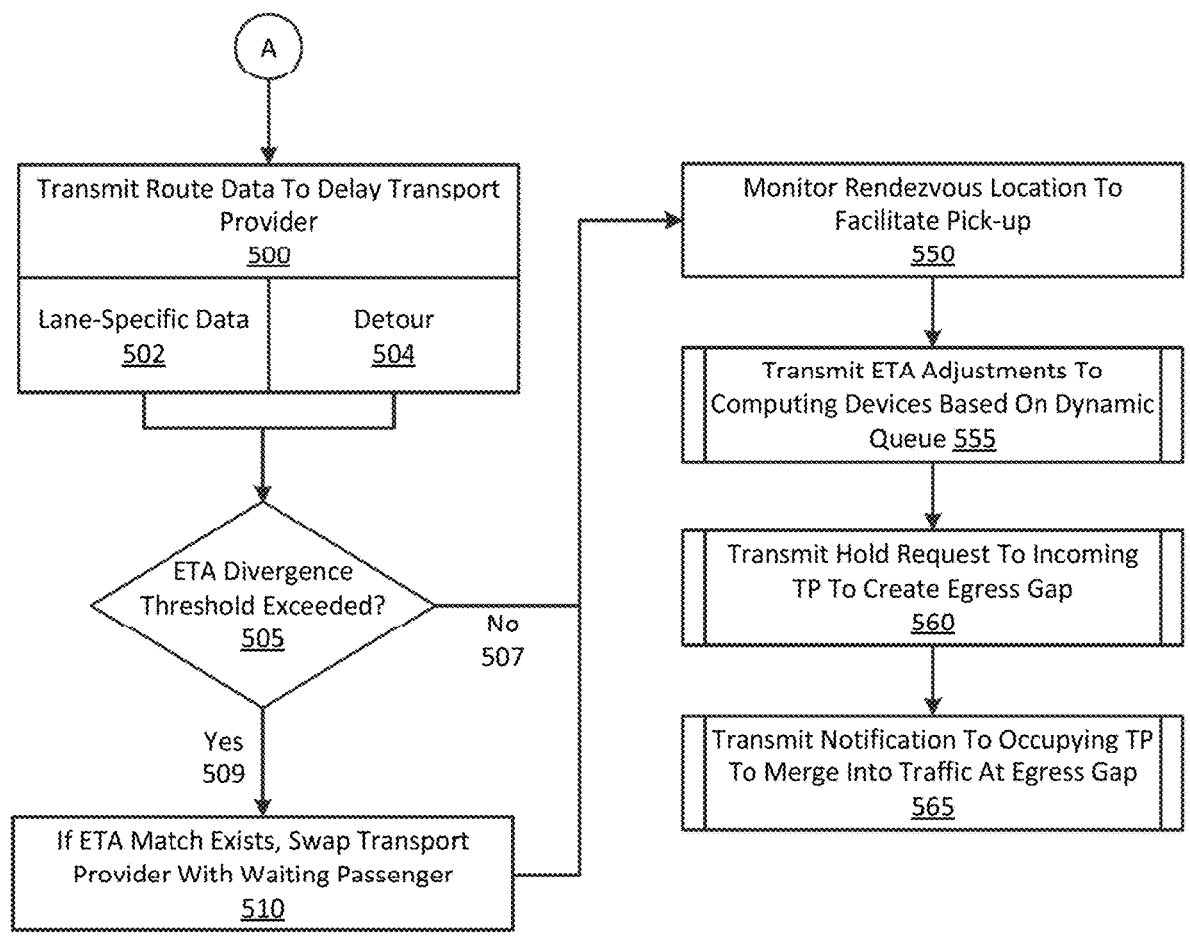
FIG. 5 is a flow chart describing another method of coordinating transport through a common rendezvous location, according to examples described herein.

FIGS. 4 and 5 are flow charts describing example methods of coordinating transport through a common rendezvous location, according to examples described herein. In the below descriptions of FIGS. 4 and 5, reference may be made to reference characters representing like features as shown and described with respect to FIGS. 1 through 3. Furthermore, the processes described in connection with FIGS. 4 and 5 may be performed by an example network computing system 100, 290 as shown and described with respect to FIGS. 1 and 2. Referring to FIG. 4, the computing system 100 can determine a set of matched requesting users 197 and transport providers 193 that are to meet at a common rendezvous location (400). As described herein, the network computing system 100 can maximize throughput for the common rendezvous location (405), in accordance with various examples.

According to examples provided herein, the computing system 100 can receive location data from the computing devices 195 of the requesting users 197 and the computing devices 190 of the transport providers 193 (410). In certain examples, the computing system 100 can further receive location data from the positioning systems of matched AVs 192. Based on the location data, the computing system 100 determine ETAs to the common rendezvous location for each of the requesting users 197 and matched transport providers 193 (415). Based on the ETAs, the computing system 100 can generate a dynamic queue for the transport providers 193 for arriving at the common rendezvous location (420). The computing system 100 can further manage the dynamic queue by sequentially routing the transport providers 193 through the common rendezvous location (425). The computing system 100 may also dynamically adjust to queue based on changes to the ETAs of the transport providers 193 and/or requesting users 197 to the common rendezvous location (430).

Referring to FIG. 5, the computing system 100 can manage and adjust the dynamic queue by transmitting route data to the computing device 190 of a transport providers 193 to delay the arrival of the transport provider 193 based on an increase in ETA of the requesting user 197 matched to the transport provider 193 (500). In certain scenarios, the route data can comprise lane-specific data that routes the transport provider 193 along more congested lanes (502). Additionally or alternatively, the route data can detour the transport provider 193 along an alternative route to the common rendezvous location (504). For example, the computing system 100 can identify an alternative route having an ETA that matches the increased ETA of the requesting user 193.

In various examples, the computing system 100 can determine whether the ETAs of a paired requesting user 197 and matched transport provider 193 diverge beyond a specified divergence threshold (e.g., one minute) (505). If so (509), then the computing system 100 can swap the transport provider 193 with a different user 197 having a more closely matching ETA (510). For example, the divergence threshold being exceeded can trigger the computing system 100 to identify candidate transport provider 193, user 197 pairs for a match swap at the common rendezvous location. In one example, a delayed user 197 and an early transport provider 193 may be swapped with a delayed transport provider 193 and early user 197 if their respective ETAs align more closely. If the ETA divergence threshold is not exceeded (507), or once a match swap has taken place, the computing system 100 can monitor the common rendezvous location to facilitate an efficient pick-up (550).

In doing so, the computing system 100 can transmit ETA adjustment data to the user device 195 of the requesting user 197 and the computing device 190 of the transport provider 193 based on adjustments to the dynamic queue (555). In certain implementations, as the transport provider 193 approaches the rendezvous location, the computing system 100 can transmit a hold request to the transport provider 193 to create an egress gap for an exiting vehicle (560). The computing system 100 can further transmit a notification to an occupying transport provider 193 to merge into traffic at the egress gap, as described herein (565). Accordingly, by generating a dynamic queue, tracking ETAs of both transport providers 193 and users 197, providing updated ETA data, leveraging match swapping techniques, and providing ingress/egress notifications to incoming and outgoing transport providers 193 for a common rendezvous location, the computing system 100 can maximize or optimize throughput for the common rendezvous location. In certain variations, the computing system 100 may further leverage the advantages of direct commands to AVs 192 for delaying arrival, creating egress gaps, monitoring the situational environment of the rendezvous location (e.g., by patching into the AV's sensor systems), and the like.

Hardware Diagram

Figure 6:
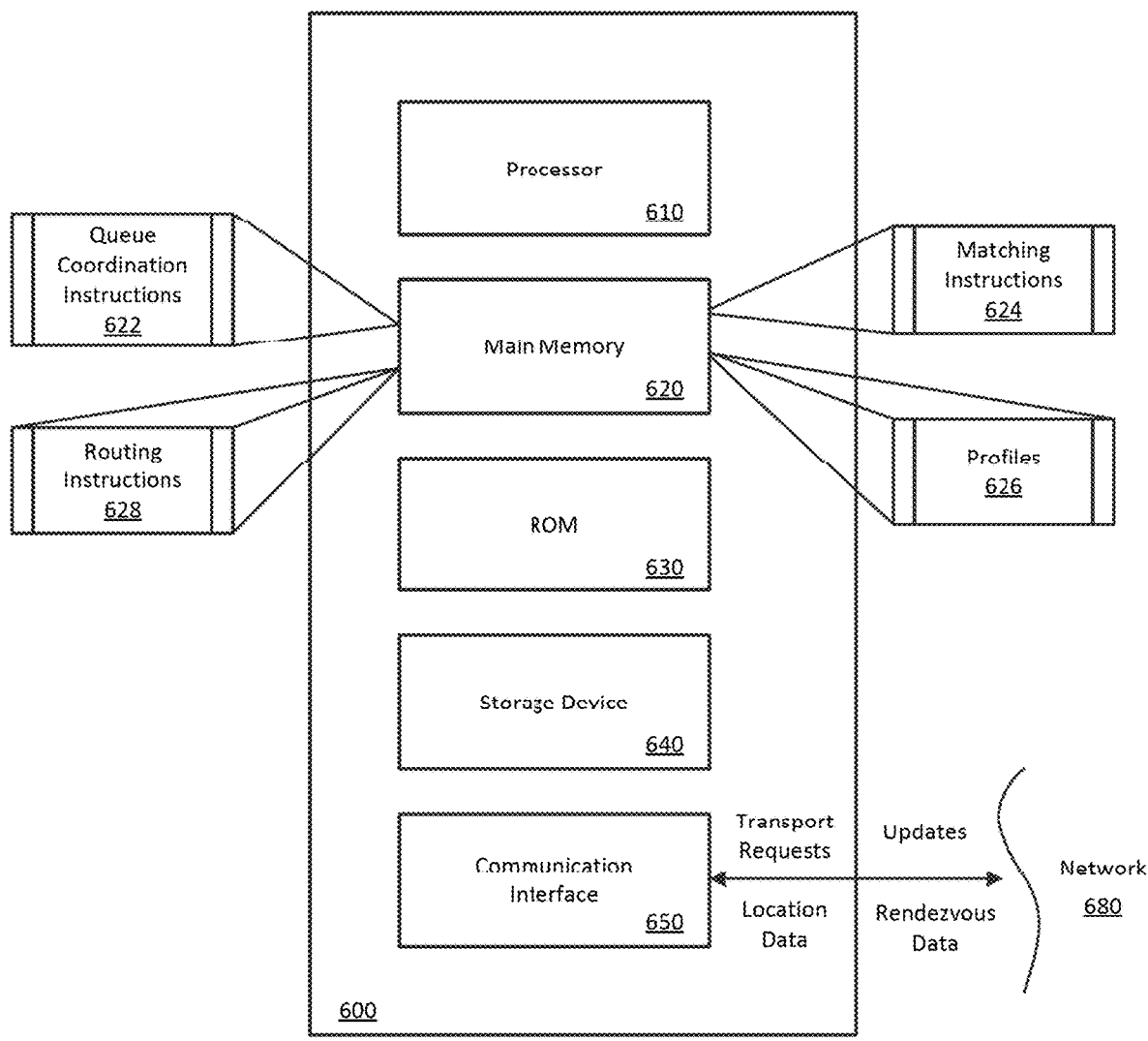
FIG. 6 is a block diagram that illustrates a computing system upon which examples described herein may be implemented.

FIG. 6 is a block diagram that illustrates a computing system 600 upon which examples described herein may be implemented. A computing system 600 can be implemented on, for example, a server or combination of servers. For example, the computing system 600 may be implemented as part of a network service, such as described in FIGS. 1 through 5. In the context of FIG. 1, the network computing system 100 and/or an on-board computing system of an AV 192 may be implemented using a computing system 600 such as described by FIG. 6. The network computing system 100 and/or computing system of the AV 192 may also be implemented using a combination of multiple computing systems as described in connection with FIG. 6.

In one implementation, the computing system 600 includes processing resources 610, a main memory 620, a read-only memory (ROM) 630, a storage device 640, and a communication interface 650. The computing system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computing system 600 may also include the ROM 630 or other static storage device for storing static information and instructions for the processor 610. A storage device 640, such as a magnetic disk or optical disk, is provided for storing information and instructions.

The communication interface 650 enables the computing system 600 to communicate with one or more networks 680 (e.g., cellular network) through use of the network link (wireless or wired). Using the network link, the computing system 600 can communicate with one or more computing devices, one or more servers, one or more databases, and/or one or more self-driving vehicles. In accordance with examples, the computing system 600 receives transport requests from mobile computing devices of individual users. The executable instructions stored in the memory 630 can include matching instructions 624, which the processor 610 executes to receive transport requests and match requesting users with transport providers, as described herein.

The executable instructions stored in the memory 620 can also include routing instructions 628, queue coordination instructions 622, and profiles 626 of transport providers and/or requesting users. The processor 610 can execute the routing instructions 628 to provide turn-by-turn routing instructions to the transport providers to, for example, provide the shortest route, delay the transport provider, and the like. The queue coordination instructions 622 can be executed by the processor 610 to generate and manage a dynamic queue of transport providers for the common rendezvous location by determining and tracking the ETAs of incoming transport providers and their matched users based on received location data. In doing so, the processor 610 can perform lookups in the profiles 626 to determine factors such as driving habits, walking pace, age, disabilities, and the like, to make adjustments to the ETAs of the transport providers and users. Execution of the queue coordination instructions 622 can further enable the computing system 600 to provide rendezvous data and updates to the users and transport providers, such as match swap information and/or delay notifications.

Examples described herein relate to the use of the computing system 600 for implementing the techniques described herein. According to one example, those techniques are performed by the computing system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computer-implemented method of managing a common rendezvous location for an on-demand transport service, the method being performed by one or more processors and comprising:
    determining a first estimated time of arrival (ETA) to a common rendezvous location for a first transport provider matched to a first user, the determining of the first ETA being based at least in part on location data from a computing device of the first user and at least in part on location data indicating a location of the first transport provider;
    determining a second ETA to the common rendezvous location for a second transport provider matched to a second user, the determining of the second ETA being based at least in part on location data from a computing device of the second user and at least in part on location data indicating a location of the second transport provider;
    generating a queue comprising a plurality of matched users and transport providers, the plurality of matched users and transport providers comprising the first user, the first transport provider matched to the first user, the second user, and the second transport provider matched to the second user, the generating of the queue being based at least in part on the first estimated ETA and the second estimated ETA;
    sequentially routing the first transport provider and the second transport provider through the common rendezvous location based on the queue, the sequentially routing comprising transmitting, via a network communication interface, first navigation data to a computing device of the first transport provider and second navigation data to a computing device of the second transport provider, the first navigation data causing the computing device of the first transport provider to autonomously maneuver the first transport provider to the common rendezvous location;
    adjusting an order of the first transport provider and the second transport provider in the queue based on at least one of a change to the first ETA or a change to the second ETA; and
    transmitting, via the network communication interface, at least one of updated first navigation data to the first transport provider or updated second navigation data to the second transport provider.

2. The method of claim 1, the updated first navigation data comprising updated turn-by-turn route data.

3. The method of claim 2, the updated turn-by-turn route data comprising lane-specific route data that delays the first transport provider by routing the first transport provider through one or more traffic-congested lanes.

4. The method of claim 2, the updated turn-by-turn route data comprising a route detour.

5. The method of claim 1, the first transport provider being an autonomous vehicle, and the second transport provider being a human-driven vehicle, the adjusting of the order of the first transport provider and the second transport provider comprising delaying the first transport provider.

6. The method of claim 1, further comprising:
monitoring this first transport provider while the first transport provider is occupying the common rendezvous location;
determining that the second transport provider is approaching the common rendezvous location;
transmitting an ingress notification to the computing device of the second transport provider, the ingress notification instructing the second transport provider to create an egress gap for the first transport provider; and
transmitting an egress notification to the computing device of the first transport provider, the egress notification instructing the first transport provider to exit the common rendezvous location via the egress gap created by the second transport provider.

7. The method of claim 6, the first transport provider and the second transport provider being autonomous vehicles, the method further comprising receiving, via the network communication interface, a live sensor data feed from a sensor system of at least one of the first transport provider or the second transport provider.

8. The method of claim 1, the common rendezvous location comprising a loading zone for at least one of user pick-up or user drop-off.

9. The method of claim 1, further comprising:
determining an ETA of the first user to the common rendezvous location;
determining an ETA of the second user to the common rendezvous location; and
based on the queue, the ETA of the first user to the common rendezvous location, and the ETA of the second user to the common rendezvous location, modifying at least one of a match of the first transport provider to the first user or a match of the second transport provider to the second user.

10. The method of claim 9, the modifying of at least one of the match of the first transport provider to the first user or the match of the second transport provider to the second user comprising matching a third user to the first transport provider.

11. The method of claim 1, the common rendezvous location comprising multiple vehicle spaces, the method further comprising:
matching the first transport provider to a first vehicle space of the multiple vehicle spaces; and
sending displayable content to at least one of the computing device of the first user or the computing device of the first transport provider, the displayable content describing the first vehicle space.

12. The method of claim 1, further comprising:
storing a first user profile for the first user, the first user profile describing a boarding time estimate for the first user;
storing a second user profile for the second user, the second user profile describing a boarding time estimate for the second user; and
modifying the queue based at least in part on the boarding time estimate for the first user or the boarding time estimate for the second user.

13. The method of claim 12, further comprising:
receiving a first transport request from the first user, the first transport request describing a first destination; and
adjusting the boarding time estimate for the first user based at least in part on the first transport request.

14. A system for managing a common rendezvous location for an on-demand transport service, the system comprising:
one or more processors; and
memory storing instructions that, when executed by the one or more processors, cause the one or more processors to perform operations comprising:
determining a first estimated time of arrival (ETA) to a common rendezvous location for a first transport provider matched to a first user, the determining of the first ETA being based at least in part on location data from a computing device of the first user and at least in part on location data indicating a location of the first transport provider;
determining a second ETA to the common rendezvous location for a second transport provider matched to a second user, the determining of the second ETA being based at least in part on location data from a computing device of the second user and at least in part on location data indicating a location of the second transport provider;
generating a queue comprising a plurality of matched users and transport providers, the plurality of matched users and transport providers comprising the first user, the first transport provider matched to the first user, the second user, and the second transport provider matched to the second user, the generating of the queue being based at least in part on the first estimated ETA and the second estimated ETA;
sequentially routing the first transport provider and the second transport provider through the common rendezvous location based on the queue, the sequentially routing comprising transmitting, via a network communication interface, first navigation data to a computing device of the first transport provider and second navigation data to a computing device of the second transport provider, the first navigation data causing the computing device of the first transport provider to autonomously maneuver the first transport provided to the common rendezvous location;
adjusting an order of the first transport provider and the second transport provider in the queue based on at least one of a change to the first ETA or a change to the second ETA; and
transmitting, via the network communication interface, at least one of updated first navigation data to the first transport provider or updated second navigation data to the second transport provider.

15. The system of claim 14, the updated first navigation data comprising updated turn-by-turn route data.

16. The system of claim 15, the updated turn-by-turn route data comprising lane-specific route data that delays the first transport provider by routing the first transport provider through one or more traffic-congested lanes.

17. The system of claim 15, the updated turn-by-turn route data comprising a route detour.

18. The system of claim 14, the first transport provider being an autonomous vehicle, and the second transport provider being a human-driven vehicle, the adjusting of the order of the first transport provider and the second transport provider comprising delaying the first transport provider.

19. The system of claim 14, the operations further comprising:
- monitoring this first transport provider while the first transport provider is occupying the common rendezvous location;
- determining that the second transport provider is approaching the common rendezvous location;
- transmitting an ingress notification to the computing device of the second transport provider, the ingress notification instructing the second transport provider to create an egress gap for the first transport provider; and
- transmitting an egress notification to the computing device of the first transport provider, the egress notification instructing the first transport provider to exit the common rendezvous location via the egress gap created by the second transport provider.

20. A non-transitory computer-readable medium storing instructions that, when executed by one or more processors of a computing system, cause the computing system to perform operations comprising:
- determining a first estimated time of arrival (ETA) to a common rendezvous location for a first transport provider matched to a first user, the determining of the first ETA being based at least in part on location data from a computing device of the first user and at least in part on location data indicating a location of the first transport provider;
- determining a second ETA to the common rendezvous location for a second transport provider matched to a second user, the determining of the second ETA being based at least in part on location data from a computing device of the second user and at least in part on location data indicating a location of the second transport provider;
- generating a queue comprising a plurality of matched users and transport providers, the plurality of matched users and transport providers comprising the first user, the first transport provider matched to the first user, the second user, and the second transport provider matched to the second user, the generating of the queue being based at least in part on the first estimated ETA and the second estimated ETA;
- sequentially routing the first transport provider and the second transport provider through the common rendezvous location based on the queue, the sequentially routing comprising transmitting, via a network communication interface, first navigation data to a computing device of the first transport provider and second navigation data to a computing device of the second transport provider, the first navigation data causing the computing device of the first transport provider to autonomously maneuver the first transport provider to the common rendezvous location;
- adjusting an order of the first transport provider and the second transport provider in the queue based on at least one of a change to the first ETA or a change to the second ETA; and
- transmitting, via the network communication interface, at least one of updated first navigation data to the first transport provider or updated second navigation data to the second transport provider.

\* \* \* \* \*

UNITED STATES PATENT AND TRADEMARK OFFICE
CERTIFICATE OF CORRECTION

PATENT NO. : 12,209,874 B2
APPLICATION NO. : 18/330124
DATED : January 28, 2025
INVENTOR(S) : Stegall et al.

Page 1 of 1

It is certified that error appears in the above-identified patent and that said Letters Patent is hereby corrected as shown below:

In the Claims

In Column 18, Line 49, in Claim 14, delete "provided" and insert --provider-- therefor Signed and Sealed this
First Day of April, 2025

Coke Morgan Stewart
*Acting Director of the United States Patent and Trademark Office*